Feb. 3, 1959   W. T. EPPLER   2,872,640
POSITIONING DEVICE
Filed Oct. 14, 1957   2 Sheets-Sheet 2
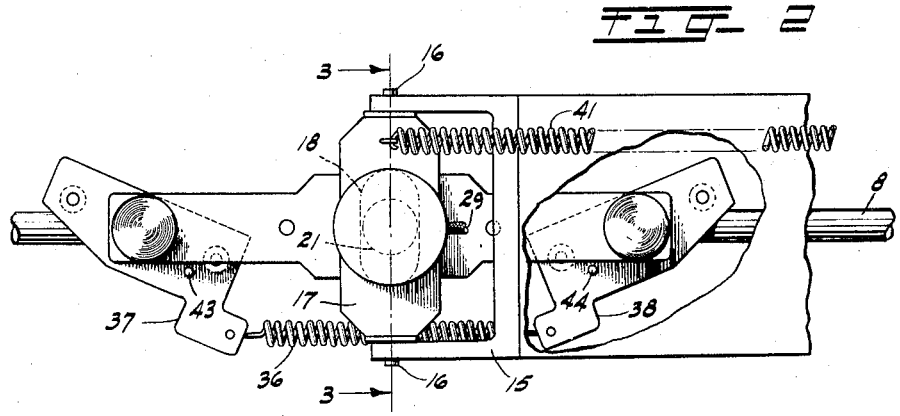
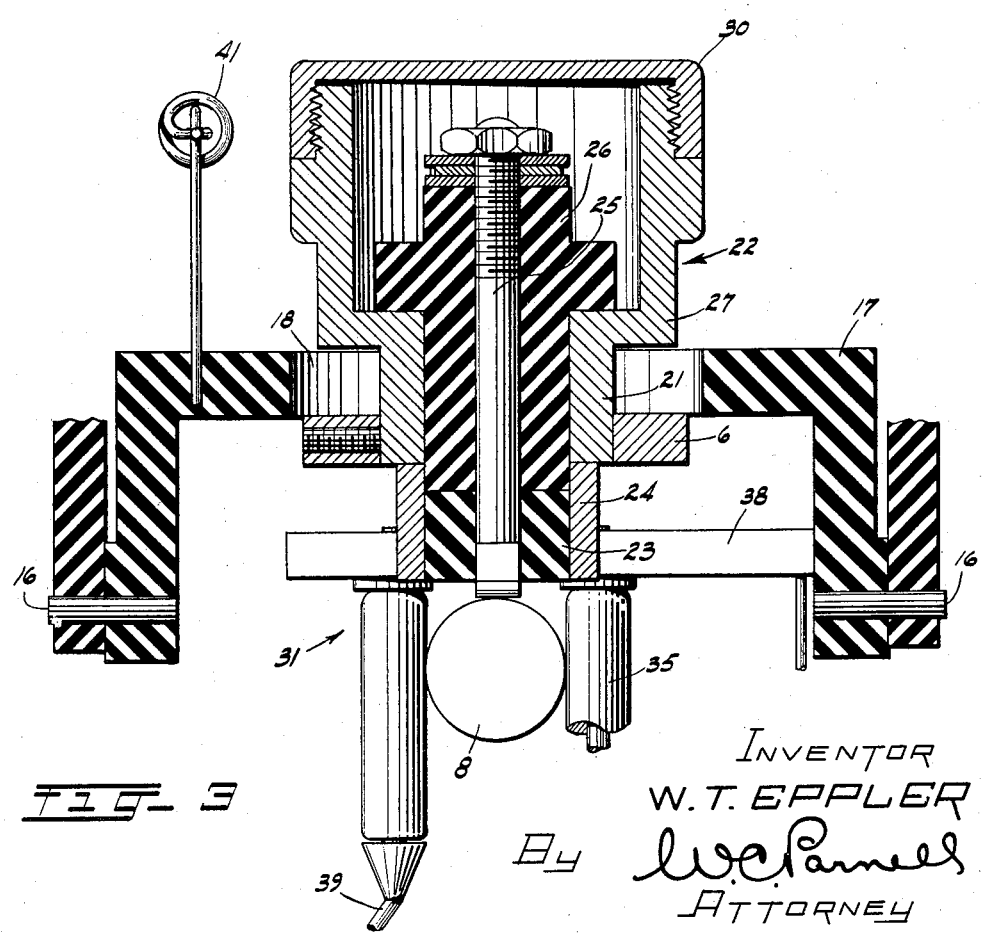
INVENTOR
W. T. EPPLER
BY
ATTORNEY

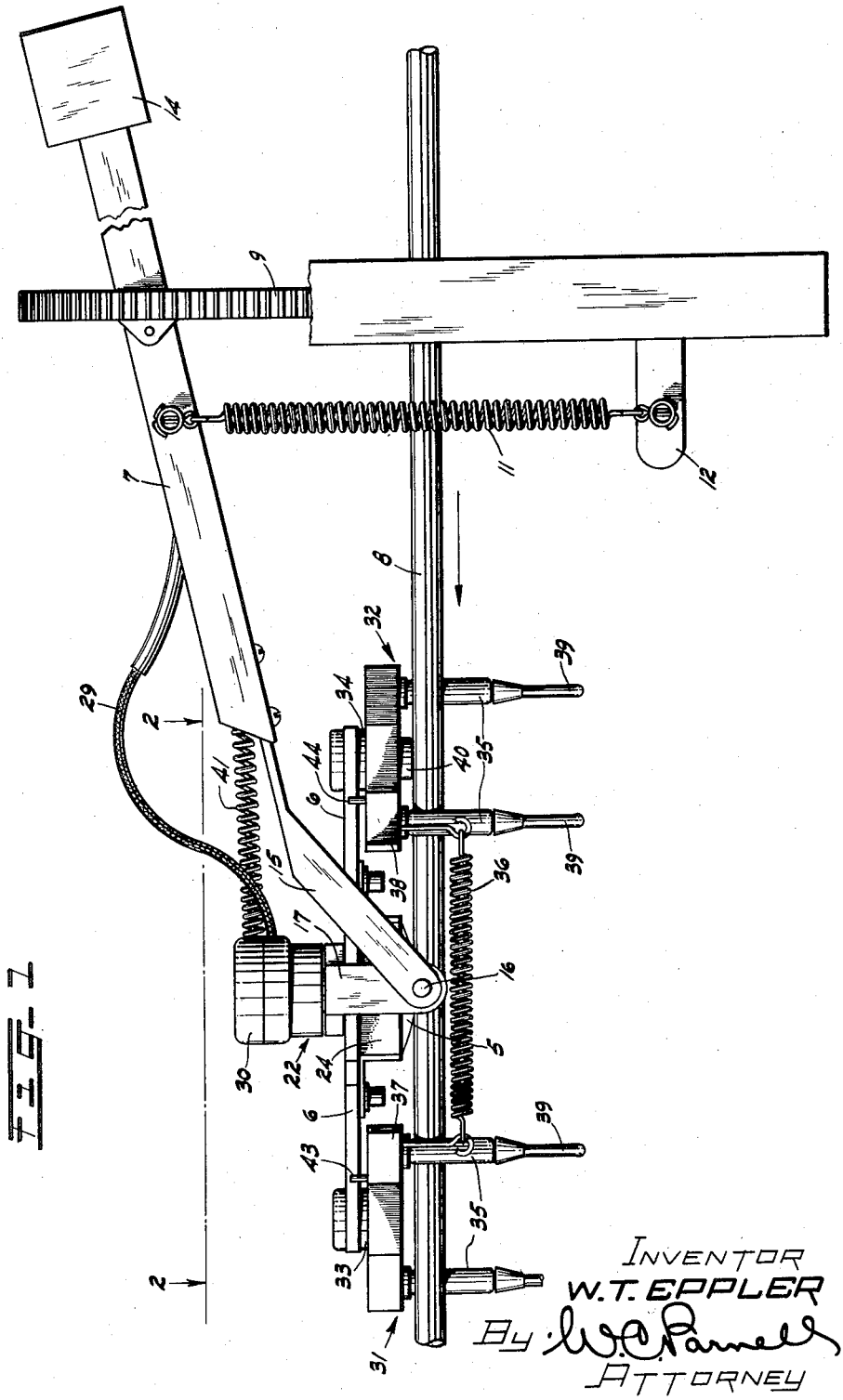

United States Patent Office 2,872,640
Patented Feb. 3, 1959

2,872,640

POSITIONING DEVICE

Walter T. Eppler, Cranford, N. J., assignor to Western Electric Company, Incorporated, New York, N. Y., a corporation of New York Application October 14, 1957, Serial No. 690,065

8 Claims. (Cl. 324—61)

This invention relates to a positioning device, and particularly to a device for supporting a sensing member in accurate alignment on a longitudinally advancing, elongated element, such as a cable.

In the production of cables having plastic-sheathed, metal-jacketed cores, such as disclosed in the Patent 2,589,700 to H. G. Johnstone, which issued March 18, 1952, the thickness of the plastic sheath is measured at various radial positions about the cable so that the extruder may be properly adjusted to produce concentric sheath. The thickness measurements are normally obtained by measuring the capacitance between a probe or electrode, supported on the sheath, and the metal jacket. To obtain accurate capacitance measurements, it is necessary that the electrode be accurately designed and be supported in accurate alignment with the moving cable so that the effective electrical field between the electrode and the cable core may be maintained uniform. With cables having diameters in excess of one inch, the positioning of the electrode on the sheath is not critical, however, considerable difficulty has been encountered with smaller size cables, resulting from their higher fabrication speeds and relatively large electrical field changes occurring with slight displacements between the cable and the electrode.

Prior attempts to eliminate relative movement and misalignment between such sensing members and moving cables have been made but with little success. For example, both roller and polisher type guides have been located before and after a fixed sensing member, with the sensing member held along the centerline of the guides. The required accuracy of electrode alignment, however, could not be realized with such arrangements due to the necessity of providing clearances in the guides (to accommodate irregularities in the outer diameter of the cables) and the inability to follow bends and twists in the cable between the guides. Another disadvantage to such arrangements was that the guides had to be adjusted or replaced to accommodate different cable sizes.

Accordingly, the object of this invention is to position a sensing member accurately on advancing elongated elements of various sizes to insure accurate alignment thereon.

According to the general features of the invention, a sensing member such as an electrode is mounted on a carriage and is held thereby in operative relation with an elongated element advanced longitudinally along a given path. The carriage is freely movable on the support and self-adjusting, aligning means on opposite sides of the electrode responsive to the instantaneous location of the advancing element accurately position the carriage, and therefore the electrode, with respect to the portion of the advancing element between the aligning means.

In a preferred embodiment, a resilient support urges the electrode on the carriage into operative relation with the advancing element and alignment of the electrode is obtained with a pair of bifurcated elements located on opposite sides of the electrode, the elements being pivotally mounted at their mid-points to rotate on the carriage along parallel axes normal to the path of the advancing element. The ends of the elements straddle the advancing element and are spring-biased into contact with opposite sides thereof, the carriage being free to move on its support both in lateral translation motion and also about two mutually perpendicular axes which, in turn, are normal to the path of the advancing element, to automatically and accurately align the electrode on the portion of the advancing element momentarily located between the two bifurcated elements.

These and other features of the invention will be more fully understood from the following detailed description of the invention when taken in conjunction with the accompanying drawing, in which:

Fig. 1 is a side elevational view of a device incorporating the general features of the invention;

Fig. 2 is a plan view of the device of Fig. 1 as seen along the plane of line 2—2 thereof, and Fig. 3 is an enlarged view of the device of Fig. 2 as seen along the plane of line 3—3.

Referring now to the drawing, an electrode 5 is mounted on the mid-portion of a carriage 6 which is urged, by a spring-biased support arm 7, toward an elongated element, in this case a cable 8, advancing longitudinally along a given path in the direction indicated by the arrow. The support arm 7 is pivoted along an axis perpendicular to the cable path and may be mounted to a fixed member or, in the event that it is desired to position the electrode 5 at various axial positions about the circumference of the cable, the arm may be pivotally mounted to a rotatable ring gear 9. The arm is biased by a spring 11, connected to an extension 12 from the ring gear, and is provided with a counterweight 14 to neutralize gravitational effects on the arm and carriage at the various rotated positions of the ring gear. An electrode force in the order of seven ounces has been found satisfactory for use on polyethylene sheathed cable.

Bifurcated end 15 on the arm 7, pivotally connected by pins 16 to a yoke 17, connects the arm 7 to the carriage 6. This permits the yoke, and therefore the carriage 6, to be rotated about an axis through the pins 16 perpendicular to the cable path. The mid-portion of the yoke has a slot 18 extending transverse the cable path and the lower surface of the slotted portion is flat for making sliding engagement with the flat top surface of the carriage 6. A cylindrical guide pin portion 21 of a member 22 fixed to the carriage extends through the slot 18 to limit lateral movement of the carriage on the yoke while also providing a pivot for rotating the carriage about an axis perpendicular to both the axes of the pivot pins 16 and also the cable path. The diameter of the portion 21 is slightly less than the narrow width dimension of the slot to provide relative movement therebetween. An upper, enlarged portion 27 of the member 22 retains the yoke in place on the carriage 6, sufficient clearance being provided between the enlarged portion and the yoke 17 to permit the carriage to slide freely. The carriage, therefore, may freely follow the advancing cable regardless of the excursion of the cable from a given path.

The electrode 5 is electrically isolated from a carriage 6 by insulator 23 supporting the electrode within a metal shielding member 24 attached to the bottom of the carriage 26. A shaft 25 connected to the electrode extends coaxially with the guide pin portion 21 of the member 22, being supported therein by an insulator 26. The top of the shaft 25 is threaded so that the electrode and insulator assembly may be rigidly bolted together. A wire 29 is connected to the bolt to connect the electrode to a test set which is not part of the present invention. A cap 30 on the top of member 22 seals the electrode shaft 25 and the associated wiring connection thereto.

Two bifurcated aligning elements 31 and 32 are pivotally mounted on the leading and trailing ends of the carriage 6 by pins 33 and 34, respectively, equally spaced on opposite sides of the electrode 5. Parallel rollers 35, on end portions of the elements, extend perpendicular to the cable path and straddle the advancing cable 8. The rollers are held in contact with the cable by a spring 36 connected between pins 45 and 46 extending from the mid-portions 37 and 38, respectively, of the aligning elements.

The aligning elements cause the carriage to slide and turn on the yoke in accordance with the relative condition of the cable between the two aligning elements and thereby align the electrode on only that short portion of the cable momentarily positioned between the two aligning elements. Since the carriage and the aligning elements are free to rotate and move when the carriage is removed from the cable, means are provided to facilitate mounting the device on the cable. Thus, stop pins 43 and 44 on the mid-portions 37 and 38, respectively, of the aligning elements engage the carriage 6 so that the released aligning elements will be slightly angularly displaced to facilitate rotation of the elements, and flared tips 39 extending outwardly from the cable path at about sixty degrees from the axes of the rollers 35 so that the two tips on each aligning element present an open V to positively receive and guide cable therebetween when the device is subsequently moved into engagement with a cable. The aligning elements make the device automatically adjustable to various sizes of cables, the larger the cable, the more the elements 31 and 32 will pivot. The rollers on each element are spaced apart a distance slightly greater than the largest diameter of the largest cable to be accommodated.

Alignment of the shoe parallel to the surface of the cable is accomplished by a two-point suspension, one point being the point of contact between the electrode and the cable, and the other being that between a shoe 40, extending from the pivot pin 34 for the aligning element 32, and the cable. The electrode 5 is provided with a curved contacting surface and, with a free floating mounting not including a second suspension point, would be unstable, due to rocking caused by the drag of the cable on the aligning elements. However, with the shoe 40 and a spring 41 connected between the yoke 17 and the arm 7, a net torque is produced on the yoke to rotate the yoke and carriage in a clockwise direction, as seen in Fig. 1, about the yoke pivot so that the shoe 40 will be held in positive engagement with the moving cable. The lifting force exterted by this moment on the arm 7 is designed to be in the order of two to three ounces, while the force exerted by the spring 11 on the arm in a direction opposing this lifting force is designed at about seven ounces. The result in that both the electrode 5 and the shoe 40 are held on the cable, thereby stabilizing the alignment of the shoe parallel to the moving cable.

The above-described structure therefore permits moving the electrode in translation motion in planes perpendicular to one another to accommodate horizontal or vertical displacement of the advancing element with respect to the device and also permits pivoting the electrode about axes in planes perpendicular to one another and perpendicular to the path of the cable in order to accommodate for bends or slight weave in the advancing element. Thus, the device provides complete freedom of motion while supporting the electrode in a stabilzed position parallel to the surface of the advancing cable and holds the electrode in alignment in accordance with the instantaneous condition of the two aligning elements. Since the device provides a high degree of accuracy in the placement of the electrode on the cable, the design requirements for the electrode itself are much less critical than they would be otherwise.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A device for positioning an electrode on an elongated element advancing longitudinally along a given path comprising a carriage, an electrode mounted on the carriage, a resilient support for urging the carriage toward said path to hold the electrode in operative relation with an element advancing therealong, connecting means between the support and the carriage to permit relative movement therebetween, a pair of carriage aligning means responsive to the instantaneous location of the advancing element, means for mounting the aligning means on the leading and trailing ends of the carriage, and means for holding the aligning means in operative relation with an element advanced along said path to locate the electrode in alignment with the portion of the advancing element between the aligning means.

2. A device according to claim 1 in which the connecting means between the support and the carriage comprises a U-shaped yoke having a slotted mid-portion with the long dimension of the slot extending toward the ends of the yoke, means pivotally connecting the support member to the ends of the yoke with the slot extending transversely to the cable path, and means on the carriage for receiving the slotted portion of the yoke in sliding contact therewith, a cylindrical guide member on the carriage perpendicular to the path and to the slot extending into the slot to permit relative movement of the carriage along the slot and around the guide member.

3. A device according to claim 2 in which the electrode is mounted along the axis of the guide member.

4. A device according to claim 1 in which each of the aligning means comprises a bifurcated element pivotally mounted to the carriage having parallel end portions extending perpendicular to the path for receiving an advancing element therebetween, and means for exerting a force on the elements to hold the end portions in friction engagement with the advancing element.

5. A device according to claim 2 in which each of the aligning means comprises a bifurcated element pivotally mounted to the carriage having parallel end portions extending perpendicular to the path for receiving an advancing element therebetween, and means for exerting a force on the elements to hold the end portions in friction engagement with the advancing element.

6. A device for positioning an electrode on an elongated element advancing longitudinally along a given path comprising a carriage, an electrode mounted on the carriage, a resilient support for urging the carriage toward an element advanced along said path to hold the electrode in operative relation therewith, a pair of bifurcated aligning elements, each having parallel end portions, means for pivotally mounting the aligning elements on the carriage, with the electrode equally spaced therebetween, to receive an element advancing along said path between the end portions of each aligning element, the end portions being parallel to each other and at right angles to the path, and resilient means for rotating each of the aligning elements on their pivot means to cause the end portions of each element to be held in contact with opposite sides of the advancing element to maintain the electrode in alignment with the portion of the advancing element located between the aligning elements.

7. A device for positioning an electrode on an elongated cylindrical element advancing longitudinally along a given path comprising a carriage, an electrode mounted on the carriage, a support arm having a bifurcated end portion, a yoke pivotally mounted to the bifurcated end portion, the axis of the pivot being transverse to the given path, a slotted, carriage-engaging, intermediate portion on the yoke for receiving the carriage in sliding engagement therewith, an extension on the carriage having a cylindrical guide portion extending through the slot to hold the carriage to the yoke and to permit pivotal action and translation movement of the carriage on the yoke, resilient means for the arm for holding the electrode on the carriage in operative relation with an advancing element, a pair of bifurcated aligning elements, each having parallel end portions, means for pivotally mounting the aligning elements on the carriage on opposite sides of the electrode along the path to receive an element advancing along said path between the end portions of each aligning element, the end portions being parallel to each other and at right angles to the path, and resilient means for rotating each of the aligning elements on their pivot means to cause the end portions of each element to be held in contact with opposite sides of the advancing element to maintain the electrode in alignment with the axis of the portion of the advancing element located between the aligning elements.

8. A device according to claim 6 having a shoe extending from the pivot of one of the aligning elements, and means for exerting a force on the yoke to rotate the carriage so that both the shoe and the electrode will be held in contact with the advancing member.

References Cited in the file of this patent
UNITED STATES PATENTS

| | | |
|---|---|---|
| 1,623,436 | Peschl | Apr. 5, 1927 |
| 2,146,442 | Price | Feb. 7, 1939 |
| 2,177,528 | Kidd | Oct. 24, 1939 |
| 2,332,182 | Stearns | Oct. 19, 1943 |
| 2,514,847 | Coroniti et al. | July 11, 1950 |
| 2,743,607 | Decker | May 1, 1956 |
| 2,834,207 | Chamberlain et al. | May 13, 1958 |